United States Patent [19]

Lenhart et al.

[11] 4,263,942

[45] Apr. 28, 1981

[54] NET-LIKE TUBULAR SUPPORT SHEATHING FOR ROD MADE UP OF A LENGTHWISE SHIRRED CASING

[76] Inventors: Richard Lenhart, Dahlemweg 4; Armin Köstner, Am Hohen Stein 36, both of 6200 Wiesbaden; Horst Hellbauer, Schützenpfad 34, 6507 Ingelheim, all of Fed. Rep. of Germany

[21] Appl. No.: 24,277

[22] Filed: Mar. 26, 1979

[30] Foreign Application Priority Data

Apr. 6, 1978 [DE] Fed. Rep. of Germany ....... 2814826

[51] Int. Cl.³ .................. F16L 11/08; F16L 11/10
[52] U.S. Cl. ...................... 138/109; 138/118.1; 138/121
[58] Field of Search ............. 138/118.1, 109, 110, 138/178, 121; 426/105, 135, 138; 53/441, 442

[56] References Cited

U.S. PATENT DOCUMENTS

| 3,639,130 | 2/1972 | Eichin | 128/157 X |
|---|---|---|---|
| 3,952,370 | 4/1976 | Greider | 17/41 |
| 4,033,382 | 7/1977 | Eichin | 138/118.1 |

FOREIGN PATENT DOCUMENTS

| 988466 | 5/1976 | Canada | 138/118.1 |
|---|---|---|---|
| 2551452 | 5/1976 | Fed. Rep. of Germany . | |
| 2291015 | 11/1976 | France . | |

*Primary Examiner*—James E. Bryant, III
*Attorney, Agent, or Firm*—Schwartz, Jeffery, Schwaab, Mack, Blumenthal & Koch

[57] ABSTRACT

A support sheathing for use, for example, on tubular sausage casings, the sheathing forming a container for a cylindrical hollow rod made of a shirred tubular casing, the sheathing comprising a heat-shrinkable, net-like, plastic tubular material, the sheathing surrounding the tubular casing about its outer cylindrical surface and forming integral end portions for covering end portions of said tubular casing, said integral end portions of the sheathing having annular openings therein surrounded by an annular bead, whereby the end openings of the sheathing permit access to the interior cavity of the hollow rod.

3 Claims, 1 Drawing Figure

U.S. Patent
Apr. 28, 1981
4,263,942
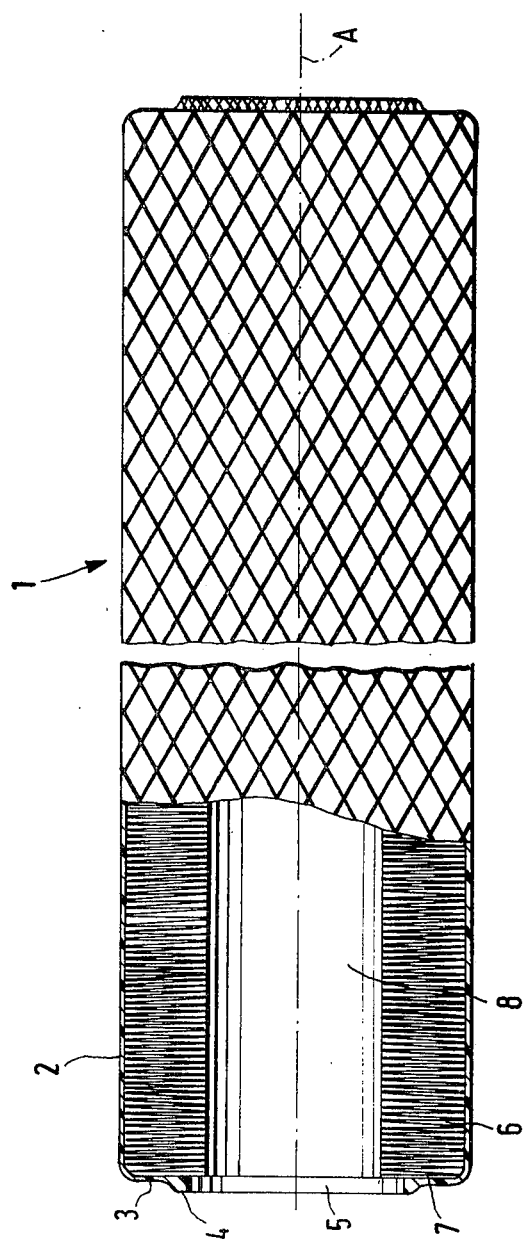

NET-LIKE TUBULAR SUPPORT SHEATHING FOR ROD MADE UP OF A LENGTHWISE SHIRRED CASING

BACKGROUND OF THE INVENTION

1. Field of the Invention

The present invention relates to a support sheathing for a shirred tubular casing used, for example, in sausages, and to a process for the manufacture of the functional unit of the sheathing and casing.

2. Description of the Prior Art

Hollow rods made up of lengthwise shirred tubular casings are often used in the production of sausages. The hollow rods which are closed at one end are pressed onto the stuffing horn of a sausage filling machine. Sausage emulsion is then pressed through the stuffing horn into the tubular casing forming the hollow rod which is continuously deshirred while it is filled with sausage emulsion.

Normally, the hollow rods are soaked in water prior to use.

Water-soaked hollow rods tend to stretch considerably in the direction of their longitudinal axes, i.e. the dimensional stability of the original hollow rods is no longer maintained after soaking them in water.

SUMMARY OF THE INVENTION

It is therefore an object of the present invention to provide a support sheathing for a hollow rod made up of a lengthwise shirred tubular casing, particularly a hollow rod of a fibre-reinforced cellulose hydrate tube. The support sheathing may comprise, for example, a tubular net of thermoplastic material, which envelops the hollow rod on all sides, but leaves the rod cavity openings free, thereby allowing an all-over moistening of the hollow rod, while ensuring its dimensional stability after water-soaking within the sheathing which forms a container. The sheathing makes it possible to use the functional unit of a container and hollow rod for the intended purpose without previously having to remove the container entirely or partly from the hollow rod.

The object of the invention is achieved by a support sheathing composed of plastic tubing, which contains in its cavity a hollow rod of a shirred tubular casing and which has the features that it is comprised of a heat-shrinkable tubular net forming a container which envelops the hollow rod on all sides, while leaving free the openings of its cavity. The integral end walls of the container each have an opening which is surrounded by an annular bead.

The container is comprised of a tubular net of thermoplastic material, particularly of a material having a basis of polyethylene. The tubular net used has a latent heat-shrinkability which may be started by the influence of heat of sufficient temperature. The resulting dimensional change of the tubular net is such that its length and diameter decrease, accompanied by a corresponding increase in thickness.

In addition, the tubular net exhibits a certain extensibility in the direction of its longitudinal axis, which allows a slight stretching of the water-soaked tubular casing within the container. This is essential for an optimum moistening of the hollow rod.

The straight tubular-net container is made in one piece and has the shape of a hollow cylinder with a circular cross section and end walls which are integral parts of the container. Each end wall is provided with an opening and is surrounded by an annular bead. These annular beads, in turn, are integral parts of the end walls of the container, and they are formed during the manufacture of the container, when the end sections of the tubular net are heat-shrunk around a supporting mandrel which protrudes at both ends from the cavity of the hollow rod. The diameter of the circular openings provided in the end walls of the container corresponds approximately to the inside diameter of the hollow rod or is slightly smaller than the inside diameter of the hollow rod.

The openings are concentrically arranged with respect to one another, in such a manner that the centers of the annular beads surrounding the openings are on the longitudinal axis of symmetry of the cavity of the container. Further, corresponding openings have the same diameter. The inside diameter of the container is slightly larger than the outside diameter of the hollow rod enclosed by it, so that there is a clearance between the inside of the container and the outside of the hollow rod. The length of the container enveloping the hollow rod on all sides is such that it fits closely to the end faces of the hollow rod.

Hollow rods, per se, made up of lengthwise shirred tube materials, for example, composed of fibre-reinforced cellulose hydrate, and processes for the manufacture of hollow rods of this kind are known and are not a subject matter of the present invention. To make the packaging process economical, tubes for use as packaging materials, particularly for use as artifical sausage casings, which have an initial length of about 25 to 35 meters are compacted prior to filling; compacting is achieved by shirring the tubes lengthwise against an abutment so that pleated structures having the shape of hollow rods are formed, which correspond in length to about one hundredth of the length of the original tube.

When the hollow rods are used for the purpose for which they are intended, there is a risk that they lengthen considerably due to mechanical influences during handling.

In the case of hollow rods which are enveloped by support sheathings there is no such risk. As already mentioned, hollow rods made up of lengthwise shirred tubular casings composed of cellulose hydrate are normally soaked in water prior to use. Since cellulose hydrate has a strong tendency towards swelling, the water-soaked hollow rods composed of this material are subject to a considerable undesired extension in the direction of their longitudinal axes, so that handling of the hollow rods during processing becomes difficult; the rods bend easily and are, thus, easily damaged.

When the hollow rod is used for packaging it is, for example, pushed upon the stuffing horn of a sausage filling machine. The sausage emulsion is then pressed through the stuffing horn into the hollow rod which is closed at one end; filling proceeds in the direction of the closed end of the rod and, with the increasing amount of sausage emulsion pressed into the casing, the hollow rod is continuously deshirred.

The invention is further concerned with a process for the manufacture of a functional unit comprising a hollow rod made up of a shirred tubular casing and a tubular-net support sheathing composed of thermoplastic material, which encloses the hollow rod on all sides, leaving free the openings of its cavity, the process having the features that a hollow rod made up of a lengthwise shirred tubular casing is pushed upon a supporting mandrel which is longer than the hollow rod, and a tubular-net sheathing composed of thermoplastic material having a latent heat-shrinkability is arranged around the hollow rod, so that it projects beyond the hollow rod at both ends. Heat which causes shrinking of the projecting ends of the tubular net is allowed to act upon these ends, and the supporting mandrel is then removed from the cavity of the hollow rod.

The supporting mandrel is a rigid straight body having a circular cross section and an outside diameter which is smaller—preferably only slightly smaller—than the diameter of the cavity of the hollow rod. The length of the supporting mandrel is such that it protrudes sufficiently from the two openings of the hollow rod when it is arranged in its cavity. The protruding ends of the mandrel should preferably be equal in length.

The term "arranging" the hollow rod in the cylindrical tubular-net sheathing is meant to denote the insertion of the hollow rod into the cylindrical tubular-net sheathing and also the fitting of the sheathing around the hollow rod.

"Removing" the straight supporting mandrel from the cavity of the hollow rod means pulling the mandrel out of the cavity and also pulling or pushing off the hollow rod enclosed by the cylindrical container from the supporting mandrel.

The length of the cylindrical tubular net is chosen in such a way that its ends project beyond the hollow rod arranged inside it, and the projecting ends should be equal in length.

When heat is allowed to act upon the projecting ends of the tubular net the ends shrink, i.e. their lengths and diameters decrease, and form the ends walls of the container, with openings which are surrounded by annular beads.

Below, the process for the manufacture of the inventive article is explained in detail by way of example.

The starting material for the manufacture of the container is a heat-shrinkable flexible tubular net preferably composed of thermoplastic material, particularly of polyethylene.

First, a hollow rod made up of a lengthwise shirred tubular casing, which is known per se, is pushed upon a rigid supporting mandrel having the shape of a rod with a circular cross section. The length of this rod is such that it protrudes at both ends from the hollow rod, with the protruding portions being equal in length.

The diameter of the supporting mandrel is only slightly smaller than the inside diameter of the hollow rod.

Then, a tubular net composed of polyethylene having a latent heat-shrinkability is arranged around the hollow rod.

For this purpose a portion of a tubular net is used which is longer than the hollow rod, so that it projects sufficiently beyond the two ends of the hollow rod. Advantageously, the projecting ends of the tubular net are equal in length.

The diameter of the tubular net is only slightly larger than the outside diameter of the hollow rod. The original length of the projecting ends of the tubular net ranges between the lengths of the diameter and the radius of the hollow rod. For the purpose of the present procedural example the projecting ends correspond in length to the diameter of the hollow rod.

Then heat of a temperature sufficient to cause heat-shrinking of the projecting ends of the tubular net is allowed to act upon these ends. Care should be taken not to heat the tubular net which is adjacent to the outside surface of the hollow rod. This may be achieved, for example, by covering the mentioned area of the tubular net, thus protecting it from the influence of heat.

In the course of the shrinking operation, the length and the diameter of the projecting ends of the tubular net are reduced and, at the same time, the thickness of the tubular net is increased; consequently, the projecting ends come into close contact with the end faces of the hollow rod, and they also contact the surface of the supporting mandrel, to an extent which depends upon the original length of the projecting ends.

In a modification of the process, the thickened areas of the projecting ends adjacent to the outside surface of the mandrel may be compressed in the direction of the end faces of the hollow rod while they are in a heat-formable condition.

For carrying out this alternative of the process stamping elements, each having an annular stamping surface and an inside diameter which is only slightly larger than the diameter of the mandrel are, immediately after heat-shrinking, pushed over the mandrel towards the end faces of the hollow rod. As a result, the heat-shrunk projecting ends of the tubular net are firmly pressed against the ends of the hollow rod.

After the heated areas of the tubular net have cooled down to room temperature the supporting mandrel is removed from the cavity of the hollow rod.

The heat applied to the projecting ends of the tube when carrying out the process may, for example, be supplied by lamps emitting infrared radiation. The partial application of heat to the tubular sheathing enveloping the hollow rod ensures that the cylindrical shell of tubular net material does not shrink.

The integral end walls of the container act as reinforcing elements, and are especially successful in counteracting the pressing effect produced by soaked hollow rods extending in the direction of the longitudinal axis of the container.

The hollow rod enclosed by the cylindrical container according to the invention may be pushed directly upon the stuffing horn of a filling machine; it is no longer necessary to remove the support sheathing from the hollow rod or to open its end closures to be able to introduce the stuffing horn into the cavity of the rod, as in the case of conventional support sheathings.

BRIEF DESCRIPTION OF THE DRAWING

The invention is further explained by the accompanying drawing. The FIGURE of the drawing depicts the support sheathing in a lateral view, partly broken away and in section to show the hollow rod in the cavity of the support sheathing.

DETAILED DESCRIPTION OF THE DRAWING

Reference numeral 1 in the drawing denotes the support sheathing forming a functional container for the hollow rod. The cylindrical shell of the container comprises a tubular net 2 and has integral end walls 3. The annular bead 4 surrounds the opening 5 of the container; 6 is the hollow rod contained in the cavity of the tubular-net sheathing 1; 7 is the end face of the hollow rod; and 8 is the cavity of the hollow rod. The straight dashand-dot line A denotes the longitudinal axis of symmetry of the hollow rod and also of the container.

While the present invention has been described with regard to a particular embodiment, modifications may readily be made by those skilled in the art, and it is intended that the claims cover any such modifications which fall within the spirit and scope of the invention.

What is claimed is:

1. A support sheathing for use, for example, on tubular sausage casings, said sheathing forming a container for a cylindrical hollow rod made of a shirred tubular casing, said sheathing comprising a heat-shrinkable, net-like, plastic tubular material, said sheathing loosely surrounding the tubular casing about its outer cylindrical surface and having integral end portions, wherein only said integral end portions of said sheathing being heat-shrunk and compressed while in a heat-formable condition for covering end portions of said tubular casing, said integral end portions of said sheathing closely contacting said end portions of said tubular casing and having annular openings therein surrounded by an annular bead, whereby the end openings of said sheathing permit access to the interior cavity of said hollow rod.

2. A support sheathing as recited in claim 1 wherein said annular opening and said annular bead are centered about the longitudinal axis of said rod.

3. A support sheathing as recited in claim 1 or 2 wherein said support sheathing comprises a polyethylene material.

* * * * *

UNITED STATES PATENT OFFICE
CERTIFICATE OF CORRECTION

Patent No. 4,263,942           Dated April 28, 1981

Inventor(s) Richard LENHART, Armin KOSTNER, Horst HELLBAUER

It is certified that error appears in the above-identified patent and that said Letters Patent are hereby corrected as shown below:

IN THE BIBLIOGRAPHICAL DATA:

Kindly insert the following:

Assignee:   HOECHST AKTIENGESELLSCHAFT,

Frankfurt/Main, Federal Republic of Germany

Signed and Sealed this

Twenty-third Day of February 1982

[SEAL]

*Attest:*

GERALD J. MOSSINGHOFF

*Attesting Officer*      *Commissioner of Patents and Trademarks*